United States Patent
Schwerin

[11] 3,788,709
[45] Jan. 29, 1974

[54] HYDRAULIC BRAKE CONTROL APPARATUS FOR A TRAILER HAULED BY A MOTOR CAR

[75] Inventor: Guenther Schwerin, Moglingen, Germany

[73] Assignee: Robert Bosch GmbH, Stuttgart, Germany

[22] Filed: Sept. 21, 1972

[21] Appl. No.: 290,885

[30] Foreign Application Priority Data
Sept. 22, 1971  Germany............................ 2147178

[52] U.S. Cl...................... 303/7, 60/589, 188/3 R, 188/359
[51] Int. Cl............................................ B60f 13/14
[58] Field of Search.... 303/7, 53, 52, 50, 13; 188/3, 188/112, 359, 345, 106 P; 74/512, 469; 60/589

[56] References Cited
UNITED STATES PATENTS
3,358,447   12/1967   Branson.................................. 303/7
3,441,319   4/1969    Boueil..................................... 303/7
3,718,373   2/1973    Hofer...................................... 303/7
3,135,358   6/1964    Greentree............................ 188/3 R Primary Examiner—Duane A. Reger
Assistant Examiner—D. C. Butler
Attorney, Agent, or Firm—Michael S. Striker

[57] ABSTRACT

The hydraulic brake of a trailer is connected by a pressure conduit with a pressure chamber formed between a brake pedal and a brake lever of a driver-operated brake on a motor car or tractor hauling the trailer. Upon depression of the brake pedal, not only the brake of the tractor is actuated, but also the hydraulic brake on the trailer, since fluid is pressed out of the pressure chamber through the pressure conduit into the hydraulic actuator of the trailer brake.

13 Claims, 3 Drawing Figures

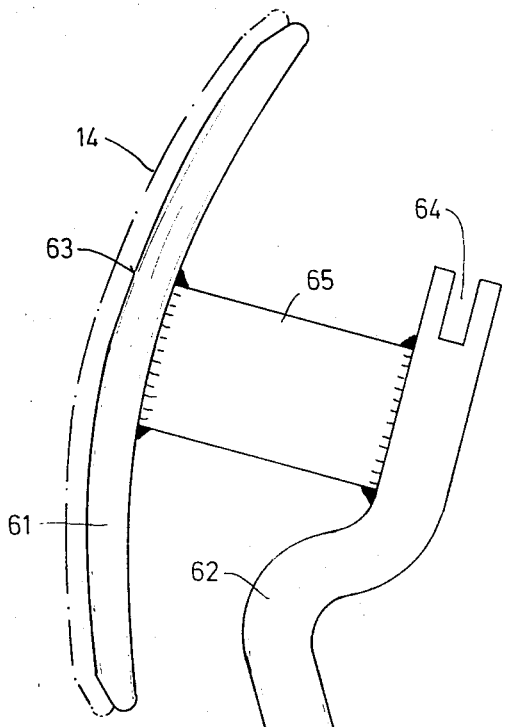
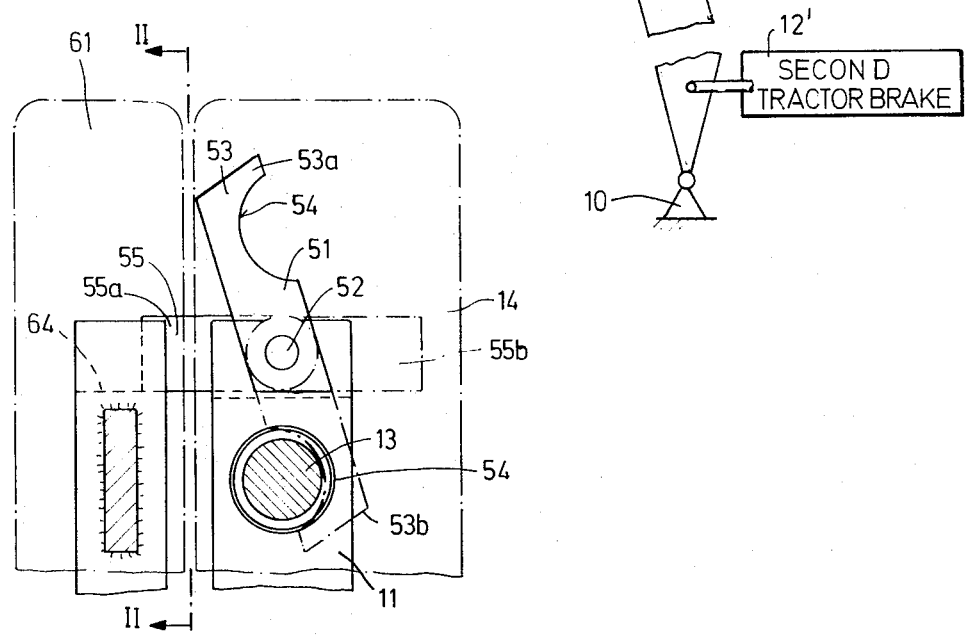

HYDRAULIC BRAKE CONTROL APPARATUS FOR A TRAILER HAULED BY A MOTOR CAR

BACKGROUND OF THE INVENTION

The present invention relates to a hydraulic brake control apparatus for a trailer hauled by a tractor or other motor car. In this application, the terms motor car and tractor are used for denoting any self-propelled driver-operated vehicle which is used for hauling another vehicle, such as a trailer.

The German GM 1,703,767 discloses a hydraulic braking apparatus in which two parallel rods of a mechanical tractor brake are articulated to a lever which is directly connected with the slide of a brake-controlling valve. The rods are connected on the one hand to a foot pedal, and on the other hand to a hand lever of the wheel brake. The apparatus is difficult to assemble and requires a great deal of space, and the transmission of the braking force is difficult so that a precise operation of the brake control valve is not possible.

The French Pat. No. 1,290,277 discloses a hydraulic braking arrangement for a trailer in which the tractor is also hydraulically braked. The brake pressure in the main cylinder of the hydraulic circuit of the tractor brake, is used at the same time as control pressure for the brake valve of the trailer. A mechanical tractor brake is not provided.

The German Pat. No. 1,077,079 discloses a brake valve for a hydraulic brake on the trailer, and a mechanical tractor brake. The brake control valve is arranged in the linkage of the tractor brake, and has three connectors for a pump, the trailer brake, and for the return of fluid. Since the brake-control valve must be movable, three flexible hoses have to be connected to the valve. Consequently, the braking arrangement requires much space, the spatial arrangement of the parts is obstructed, and the apparatus tends to have disturbances during operation. Furthermore, energy losses are caused by continuously flowing pressure fluid streams.

SUMMARY OF THE INVENTION

It is one object of the invention to provide a hydraulic brake control apparatus for a trailer hauled by a motor car or tractor having a brake.

Another object is to provide a brake-control apparatus of simple construction, which overcomes the disadvantages of corresponding prior-art constructions, and has a simple structure even if the distance between the tractor and the trailer is very great. Another object of the invention is to provide a trailer brake which is simultaneously operated with the brake of the hauling motor car and tractor so that the tractor and trailer are simultaneously braked.

A further object of the invention is to use the brake pedal of a tractor for operating the brake of the trailer.

Another object is to provide a hydraulic brake control apparatus which can be built into existing tractor and trailer combinations.

With these objects in view, the present invention provides a pressure generator in the mechanical brake of the tractor. The pressure generator is connected by a pressure conduit with the brake control means, and more particularly a brake control valve, of the brake of the trailer. The arrangement of the invention permits the control of the hydraulic trailer brake by a part of the driver-operated brake means of the tractor, even if there is a great distance between the tractor and trailer brakes. Only a single pressure conduit is required between the tractor and the trailer, and this pressure conduit can be arranged in a protected position. Energy losses due to leakage are reduced to a minimum.

In a particularly advantageous arrangement of the invention, the pressure generator is arranged in the brake pedal of the tractor brake where the pressure generator requires little room, is easily accessible and does not require changes of the parts of brake linkages provided initially on the respective tractor. A particularly simple pressure generator is obtained in accordance with the invention, if the brake pedal is mounted on a bolt carried by the brake lever of a mechanical tractor brake so that depression of the foot pedal by the driver of the tractor, causes reduction of the volume of the pressure chamber and thereby flow of pressure fluid through the connecting conduit to the trailer brake means.

Preferably, a control valve is provided which is operated by the brake pedal to close the pressure chamber during depression of the pedal, and open the pressure chamber when the pedal is in the normal inoperative position. In the preferred embodiment, the control valve is a needle valve cooperating with a valve seat on the piston portion of the volt. Due to the provision of the control valve for the pressure generator, a reliable pressure build-up and pressure reduction are obtained, so that no disturbances of the operation take place in any position of the brake pedal.

The apparatus of the invention can also be advantageously used in an arrangement in which wheels of the tractor are separately and selectively braked by two brake pedals.

In such a case, interconnecting means are provided between the pedals for separating the two pedals for selective operation of different tractor brakes, the interconnecting means having another position in which the two pedals are rigidly connected for simultaneous operation so that both tractor brakes, and also the trailer brake, are operated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a side view, taken on line II—II in FIG. 3, and illustrating a second brake pedal adjacent the first brake pedal and operating a second brake of the tractor; and FIG. 3 is a fragmentary sectional view taken on line III—III in FIG. 1, and illustrating interconnecting means between the brake pedals.

DESCRIPTION OF THE PREFERRED EMBODIMENTS

Figure 1:
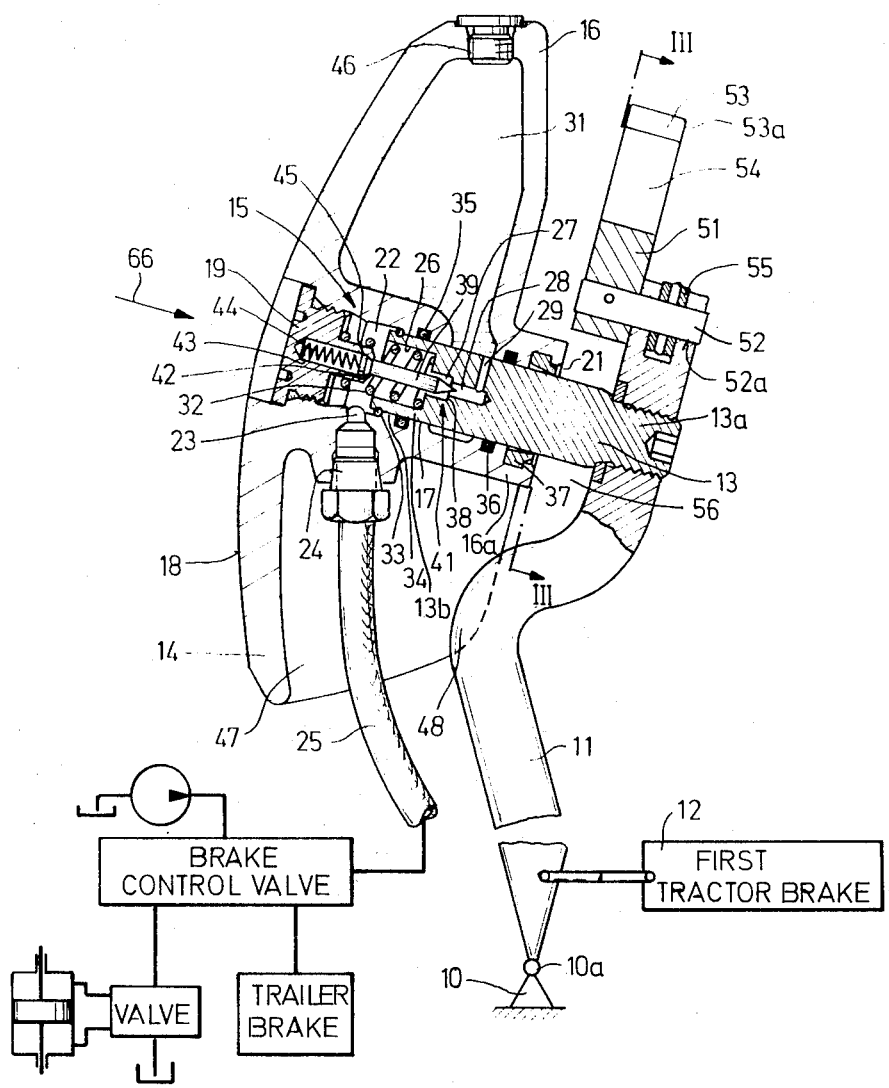
FIG. 1 is a longitudinal sectional view illustrating an embodiment of the invention in which the brake pedal of the tractor is used for operating the tractor brake and also the trailer brake.

Referring first to FIG. 1, a brake lever 11 is mounted in a schematically illustrated bearing 10 on the frame of a tractor or other motor car hauling a trailer, and operates through a link, a mechanical tractor brake 12, which is only schematically shown. The angular displacement of brake lever 11 about the axis 10a in clockwise direction, will cause operation of the tractor brake. The upper end of brake lever 11 has a threaded bore in which a threaded portion 13a of a cylindrical bolt 13 is fixedly mounted. A brake pedal 14 includes a casing 16 with a cylinder bore 17 into which the piston portion 13b of bolt 13 projects in sliding engagement, forming a pressure chamber 22 which is part of a fluidic pressure generator 15. Pressure chamber 22 communicates through a bore in the pedal 14 with a pressure conduit 25 which is shown to be a flexible hose detachably secured to pedal 14 by threaded connection 24.

The pressure conduit 25 is connected to the brake control valve of the trailer brake; the brake control valve is arranged in a hydraulic circuit.

The step-on surface 18 has a stepped threaded recess into which a threaded plug 19 is screwed for bounding the pressure chamber 22 and closing the cylinder bore portion 17.

Pressure chamber 22 is connected by stepped bores 26, 27, 28, and by a radial duct 29 with a container for a pressure fluid provided in a casing portion 16 which has on top a threaded bore normally closed by a threaded plug 46 which has an air filter. The fluid 31 in casing 16 has low pressure and can flow through duct 29 into the pressure chamber 22 when the pedal is in the illustrated normal inoperative position.

A return spring 32 is located in pressure chamber 22, and abuts on one end on bolt 13, and on the other end on the closure plug 19, so that brake pedal 14 with casing 16, and a pair of lateral walls 47 is always urged to a normal inoperative position shown in FIG. 1. Movement of the brake pedal 14 by the pressure of spring 32 is limited in the normal position by stop means in form of a spring ring 33 mounted on bolt 13 and engaging an annular shoulder in the inner surface 17 of pedal 14.

A sealing ring 35 is provided adjacent the annular shoulder 34, and seals the pressure chamber 22 from the pressure fluid 31 in the casing 16. Another sealing ring 36 is provided around the bolt 13 in a cylinder-shaped casing portion 16a to prevent leakage of pressure fluid 31 along the bolt out of casing 16. At the end 21 of the cylindrical casing portion 16a, a stripper ring 37 is mounted.

The stepped bores 27 and 28 form a valve seat 38 which, together with a needle valve member 39, forms a control valve 41. Needle valve member 39 has a flange 42 at its rear end located in a central bore 43 of the closure plug 19, engaged by a comparatively weak valve spring 44 so that the flange 42 abuts an annular shoulder 45 of the closure plug 19.

Since the return spring 32 urges pedal 14 to the normal inoperative position, needle valve member 39 is retracted to the illustrated open position in which only the point of the needle valve member is located in the valve seat so that communication between the pressure chamber and the fluid 31 in casing 16 can take place. However, when the brake pedal 14 is depressed a very small distance, the needle valve member 39 closes the valve seat 38, and thereby pressure chamber 22. The air filter in the closure plug 46 on top of casing 16 permits an equalizing of the pressures, but prevents the loss of fluid 31.

The two lateral walls 47 on opposite sides of the step-on wall 18 are spaced a distance corresponding to the thickness of the brake lever 11, so that pedal 14 is guided for movement along the bolt 13, and cannot turn about the axis provided by the piston portion 13b of bolt 13. The pressure conduit 25 is also located between the lateral walls 47, and protected by the same.

OPERATION

In the illustrated inoperative position of the brake pedal 14, the control valve 41 is open, as shown in FIG. 1, and the pressure chamber 22 communicates with pressure fluid 31 in casing 16. Consequently, no pressure fluid can flow through pressure conduit 25 to the control valve of the trailer brake. Brake lever 11 and the tractor brake controlled thereby, are also in the normal inoperative position of rest.

When the brake pedal 14 is depressed in the direction of the arrow 66, the casing 16 slides with the inner cylinder surface 17 on the piston portion 13b of the bolt 13 against the force of the return spring 32 which is overcome by foot pressure on the step-on surface 18. It will be understood that the pedal 14 can also be operated by manual pressure, and the term "pedal" as used in the present application is intended to embrace manually operated means.

The movement of the depressed pedal 14 displaces the needle valve member 39 to a position closing valve seat 38 so that pressure chamber 22 is closed and disconnected from the pressure fluid 31. Consequently, further movement of pedal 14 in direction of the arrow 66 causes reduction of the volume of pressure chamber 22 and increase of the pressure in the pressure chamber 22 so that pressure fluid flows through connector 24 and conduit 45 to the control valve of the trailer brake. The increased pressure in pressure chamber 22 also presses the needle valve 39 against the valve seat 38.

The relative movement between the pedal 14 and the bolt 13 is limited, and when the pressure chamber 22 is sufficiently reduced, the foot pressure applied to pedal 14 acts also on the bolt 13 and the brake lever 11 to operate the mechanical brake 12 of the tractor.

As long as there are no substantial fluctuations in the direction of the foot pressure on the surface 18 of brake pedal 14, the control pressure in pressure chamber 22 is proportional to the foot pressure so that the hydraulic braking of the trailer always takes place proportional to the mechanical braking of the tractor.

When the brake operation has been completed, the return spring 32 returns the brake pedal to the normal position of rest, so that the control valve 41 is opened, permitting any leakage losses to be replaced by fluid 31 out of casing 16 and flowing through duct 29 and the valve seat 38. Since the control valve 41 remains open, a pressure build-up in the pressure chamber 22 due to pressure fluid entering pressure chamber in a return flow from pressure conduit 25, is prevented.

It is advantageous to provide two foot pedals for selectively operating on the left and right wheels of the tractor. On the other hand, it is also desirable to operate the trailer brake only when both foot pedals, and corresponding brakes, are simultaneously actuated.

As shown in FIGS. 1 and 2, an interconnecting and locking member 51 includes a journalled portion mounted in a bearing bore 52 at the upper end of brake lever 11. The interconnecting means 51 include a locking member 53 with a semicircular recess 54, and a coupling member 55 which define an acute angle, as best seen in FIG. 3 in solid lines in positions 55a and 53a. Locking member 53 has such a thickness as to exactly fit into the space between the end 21 of pedal 14 and the upper portion of the brake lever 11, as best seen in FIG. 1. When locking member 53 is turned from the position 53a to the position 53b, as shown in FIG. 3, with recess 54 engaging bolt 13, foot pressure on pedal 14 cannot displace pedal 14 along the piston portion 13b of bolt 13, and the foot pressure is directly and mechanically transmitted to the brake lever 11 to operate the tractor brake, while the trailer brake is not hydraulically actuated since no fluid is pressed out of pressure chamber 22 into conduit 25.

As shown in FIGS. 2 and 3, a second brake pedal 61 is provided which has a step-on surface 63, a welded connecting part 65, and a brake lever 62 provided with a slot 64, and being connected with a second tractor brake 12'. As best shown in FIG. 3, the second brake pedal 61 is located adjacent the first brake pedal 14. The first brake pedal 14 operates, for example, the brake for the right wheel of the tractor, and the second brake pedal 61 brakes the left wheel of the tractor, permitting the selective braking of individual wheels.

The second brake lever 62 has a coupling slot 64.

As best seen in FIG. 3, the step-on surface 18 of the first pedal 14 is greater than the step-on surface of the second brake pedal 61. Furthermore, in the normal inoperative position of both brake pedals 14, 61, the step-on surface 18 projects from the step-on surface 63 of the second brake pedal 61 so as to be engaged first by the foot of the operator.

As shown in FIGS. 1 and 3, the coupling member 55 of the interconnecting means 51 engages the slot 64 of the second brake lever 62, while the locking latch 53 in the position 53a is outside of the space between the pedal and the actuating lever 11. Consequently, both pedals 14, 61 are simultaneously operated, and the first and second brakes for the left and right wheels of the tractor are simultaneously actuated. Since also brake pedal 14 is depressed, a flow of pressure fluid flows from the pressure generator 15 into the pressure conduit 25 to actuate the trailer brake simultaneously with both brakes of the tractor. The braking operations are also synchronized by the fact that the step-on surface 18 projects beyond the step-on surface 63 of pedal 61. The operation is further improved by the different surface area of the step-on surfaces 18 and 63.

When the interconnecting means are turned to the broken-line position shown in FIG. 3, the coupling member 55 in the position 55b is disconnected from the coupling slot 64 and from the second pedal 61. At the same time, the locking member 53 in the broken-line position 53b is located in the space between the brake lever 11 and the end 21 of the pedal 14, 16, so that pedal 14 cannot move relative to bolt 13 and depression of pedal 14 causes displacement of the brake lever 11 without operation of the pressure generator 15. In this position of the interconnecting means 53, the two pedals 14 and 61 are selectively and individually operated to brake the left or right wheel of the tractor, without actuating the brake of the trailer.

In the above description of a preferred embodiment of the present invention, it will become apparent that a hydraulic brake control apparatus according to the invention comprises driver-operated brake means 14, 11, 13 for braking the tractor, and preferably a brake pedal; a fluidic pressure generator on the tractor actuated by the driver-operated brake means, particularly by the brake pedal 14, to produce a flow of pressure fluid whose pressure depends on the force applied to the pedal of the driver-operated brake means; pressure-responsive hydraulic trailer brake means for braking the trailer; and pressure conduit means 25 connecting the pressure generator 15 with the trailer brake means so that actuation of the pressure generator 15 by the driver-operated brake means, particularly by pedal 14, causes actuation of the trailer brake means and simultaneous braking of the tractor and trailer.

It will be understood that each of the elements described above, or two or more together, may also find a useful application in other types of brake control apparatus for a trailer hauled by a motor car or tractor differing from the types described above.

While the invention has been illustrated and described as embodied in a hydraulic brake control apparatus for a trailer hauled by a tractor or other motor car including a pressure generator controlled by pedal pressure and controlling a hydraulic trailer brake, it is not intended to be limited to the details shown, since various modifications and structural changes can be made without departing from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the specific or generic characteristics of the invention and, therefore, such adaptations and modifications should and are intended to be comprehended within the meaning and range of equivalence of the following claims.

What is claimed as new and desired to be protected by Letters Patent is set forth in the appended claims.

I claim:

1. Hydraulic brake control apparatus for a trailer hauled by a motorcar, comprising driver-operated mechanical brake means for braking said motorcar and including a brake pedal means; a fluidic pressure generator on said motorcar located in, and operated by said brake pedal means for producing a flow of pressure fluid whose pressure depends on the force applied to said pedal means of driver-operated brake means; pressure responsive hydraulic trailer brake means for braking the trailer; and pressure conduit means connecting said pressure generator with said trailer brake means so that actuation of said pedal means of driver-operated brake means causes actuation of said trailer brake means and simultaneous braking of the motorcar and trailer.

2. Brake control apparatus as claimed in claim 1 wherein said driver-operated brake means include a brake on said motorcar, a brake lever, a bolt fixedly secured to said brake lever and having a piston portion formed with a valve seat, to said brake pedal means having a cylinder portion in which said piston portion is located so that a pressure chamber is formed in said cylinder portion and said pedal means can move relative to said bolt whereby the volume of said pressure chamber is reduced when said pedal means is depressed, a return spring in said pressure chamber abutting said bolt and said pedal means for returning said pedal to a normal inoperative position, said pedal means having a bore opposite said valve seat, a valve spring located in said bore, a needle valve member movably located in said bore and biassed by said valve spring toward said valve seat, said pedal means forming a reservoir for an operating fluid communicating through said valve seat with said pressure chamber in said normal inoperative position of said pedal means, said needle valve member closing said pressure chamber in the depressed position of said pedal means so that the pressure is increased in said chamber and pressure fluid flows through said pressure conduit means to said trailer brake means for operating the same together with said brake on said motorcar.

3. Hydraulic brake control apparatus for a trailer hauled by a motorcar, comprising driver-operated brake means for braking said motorcar, and including a brake on said motorcar, a brake lever, a bolt carried by said brake lever, and a driver-operated pedal means mounted on said bolt for limited movement, and forming with said bolt a pressure chamber of variable volume; a fluidic pressure generator on said motorcar including said chamber and actuated by said pedal means for producing a flow of pressure fluid whose force depends on the force applied to said pedal means; pressure responsive hydraulic trailer brake means for braking the trailer; and pressure conduit means connecting said pressure chamber with said trailer brake means so that upon actuation of said pedal means, said brake is operated and pressure fluid flows from said pressure chamber through said pressure conduit means to said trailer brake means and actuates said trailer brake means for simultaneous braking of the motorcar and of the trailer.

4. Brake control apparatus as claimed in claim 3 wherein said driver-operated brake means include a return spring located in said pressure chamber and having one end abutting said bolt and an other end abutting said pedal means and biassing said pedal means toward a normal inoperative position, and stop means limiting movement of said pedal means by said return spring relative to said bolt in said normal inoperative position.

5. Brake control apparatus as claimed in claim 3 wherein said pedal means includes two lateral walls and a step-on plate between said lateral walls, said lateral walls being located on opposite sides of said brake lever and slidably engaging the same so that said pedal means can not turn about said bolt.

6. Brake control apparatus as claimed in claim 5 wherein said pressure conduit means is connected with said pressure chamber, detachably mounted on said pedal means, and partly located between said lateral walls.

7. Brake control apparatus as claimed in claim 3 wherein said pedal means includes a casing forming a reservoir for operating fluid communicating with said pressure chamber, and a control valve connecting said reservoir with said pressure chamber in a normal inoperative position of said pedal means, and closing said pressure chamber when said pedal means is depressed for reducing the volume of said pressure chamber.

8. Brake control apparatus as claimed in claim 7 wherein said casing has a top portion with a threaded bore, and includes a threaded plug having an air filter and being threaded into said threaded bore.

9. Brake control apparatus as claimed in claim 7 wherein said control valve including a valve seat formed in said bolt, and a spring biassed valve member movably mounted in said pedal means and operated by said pedal means to engage said valve seat when said pedal means is depressed.

10. Brake control apparatus as claimed in claim 3, further comprising second driver-operated brake means including second pedal means, a second brake lever secured to said second pedal means, and a second brake for braking said motorcar, and interconnecting means having a first position connecting said two brake pedal means for movement together so that the first pedal means reduces the volume of said pressure chamber when depressed together with said second pedal means so that both said brakes of said motorcar and said trailer brake means are together actuated, and a second position separating said two pedal means for independent movement so that said brakes of said motorcar can be selectively operated, and also blocking said first pedal means against movement relative to said brake lever and to said bolt so that the volume of said pressure chamber remains constant and said trailer brake means are not actuated when said first brake pedal means is depressed for actuating the first brake on said motorcar.

11. Brake control apparatus as claimed in claim 10 wherein said interconnecting means include a locking means mounted on the first brake lever which carries said bolt, for turning movement between a first position engaging a coupling slot in said second pedal means, and a second position releasing said coupling slot and located between said first brake lever which carries said bolt and the respective first pedal means so that the latter can not move relative to said bolt and to the respective brake lever.

12. Brake control apparatus as claimed in claim 10 wherein said first and second pedal means have first and second step-on surfaces, respectively, said first surface projecting from said second surface so as to be first engaged by the foot of the operator.

13. Brake control apparatus as claimed in claim 12 wherein said first surface is larger than said second surface.

* * * * *